United States Patent [19]

Schmidt

[11] Patent Number: 4,806,913

[45] Date of Patent: Feb. 21, 1989

[54] GAS DETECTOR FOR MEASURING COACTING SURFACES

[76] Inventor: Charles J. Schmidt, P.O. Box 757, Diboll, Tex. 75941

[21] Appl. No.: 190,329

[22] Filed: May 5, 1988

Related U.S. Application Data

[63] Continuation of Ser. No. 1,777, Jan. 9, 1987, abandoned.

[51] Int. Cl.[4] .................................. G08B 21/00
[52] U.S. Cl. .................................. 340/679; 73/46; 340/687; 340/626
[58] Field of Search ............ 340/679, 687, 626, 544, 340/545, 550, 554, 591; 116/212, DIG. 1, 70, 208; 73/760, 46; 411/8, 13, 14; 403/27, 5, 15; 269/23; 137/565; 48/191

[56] References Cited

U.S. PATENT DOCUMENTS

| | | | |
|---|---|---|---|
| 1,219,723 | 3/1917 | Gracey | 340/591 |
| 4,513,605 | 4/1985 | Hawerkamp | 73/40 |
| 4,593,277 | 6/1986 | Langan | 340/680 |

Primary Examiner—Joseph A. Orsino
Assistant Examiner—Jill D. Jackson
Attorney, Agent, or Firm—Fulbright & Jaworski

[57] ABSTRACT

An apparatus for detecting when bolts, holding coacting surfaces of two objects together become loose. A gas supply is connected to a gas passageway in one of the bodies which extends to the coacting surfaces. A gas reservoir is positioned downstream of the gas supply and a flow orifice is connected to downstream of the reservoir. A pressure measuring switch is connected to the gas passageway and is actuated upon a drop of gas pressure to a predetermined value. An alarm is connected to the switch and when actuated provides an indication of the separation of the coacting surfaces.

7 Claims, 1 Drawing Sheet

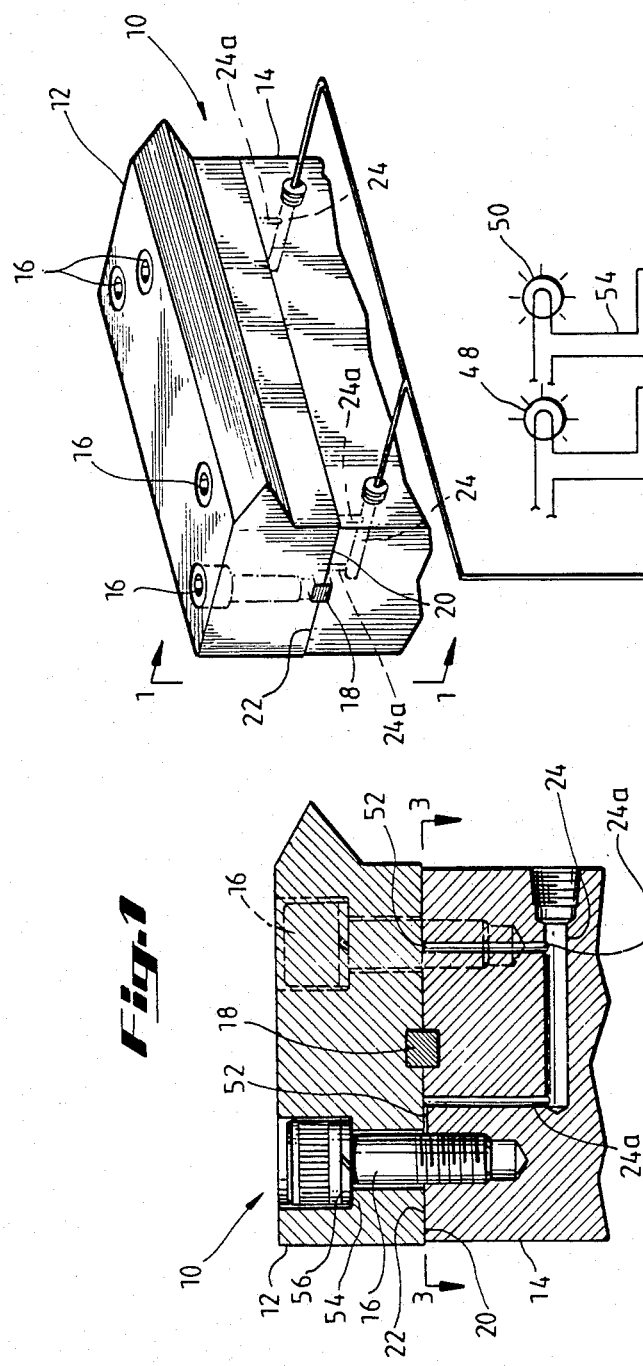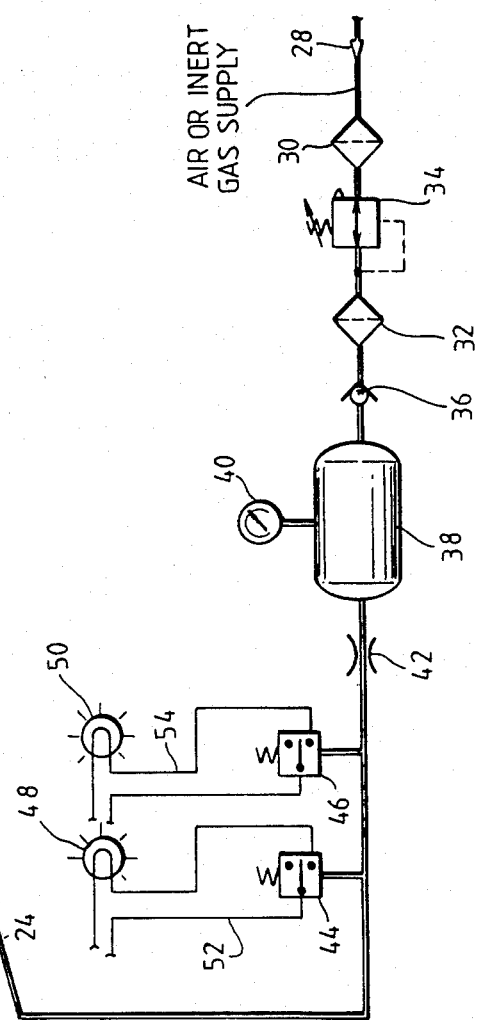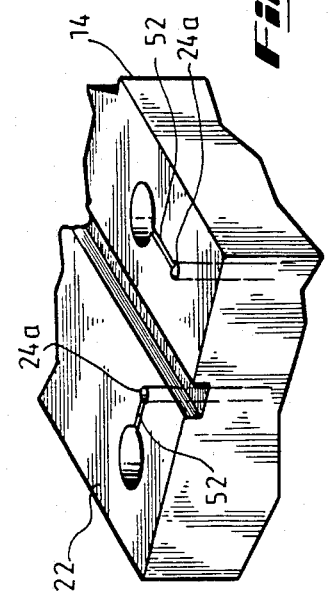

4,806,913

GAS DETECTOR FOR MEASURING COACTING SURFACES

This is a continuation of application Ser. No. 001,777, filed Jan. 9, 1987, now abandoned.

BACKGROUND OF THE INVENTION

A wood chipper in which waste veneer is made into chips, an elongate anvil, which coacts with a cutter, is bolted to an anvil base. However, because of the forces applied to the anvil, the bolts and the anvil become loose from the base and cause a considerable damage to the chipper and results in expensive repairs and expensive down time. Therefore, it becomes important to know when the bolts securing the anvil to the base become loose before damage occurs. Because of vibration and the high moisture, the usual mechanical and electronic sensors are not satisfactory.

The present invention is directed to a detector which is useful for supplying gas to the mating surfaces of two bolt held members and produces an alarm in the event that the bolts become loose and the surfaces separate to allow the gas to escape.

SUMMARY

The present invention is directed to an apparatus for detecting when the bolts, holding coacting surfaces such as a chipper anvil to a chipper base together, become loose. The apparatus includes a gas passageway in the base extending to the coacting surfaces and connected to a gas supply. Pressure measuring means are connected to the gas passageway and an alarm means is connected to the pressure measuring means for providing an alarm when the coacting surfaces are loosened and allow the gas pressure to fall below a predetermined value.

Another object of the present invention is the provision of an apparatus for detecting when bolts, holding coacting surfaces of two members together, become loose and include a gas passageway in one of the members extending to the coacting surfaces and connected to a gas supply connection for supplying gas to the passageway. A gas reservoir is connected to and positioned downstream of the connection and a flow orifice is connected to the reservoir and positioned downstream of the reservoir. A pressure measuring switch is connected to the gas passageway downstream of the orifice and is actuated upon a drop of the gas pressure to a predetermined value. Alarm means are connected to and actuated by the switch upon a predetermined drop in pressure for providing an indication of the separation of the coacting surfaces.

Still a further object is the provision of gas passageway extension grooves to the area of the fasteners or bolts for measuring when the fasteners or bolts have a defect or the coacting surfaces allow the escape of gas.

A still further object of the present invention is wherein the members are a chipper anvil connected to a chipper base and a gas passageway is provided adjacent each end of the base extending to the coacting surfaces and is connected to a gas supply connection.

Still a further object of the present invention is the provision of a check valve positioned between the gas supply connection and the gas reservoir for allowing the flow of gas to the reservoir.

Yet a still further object is the provision of additional pressure actuated switches which are actuated upon different predetermined drops of gas pressure for actuation of multiple alarms.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is a schematic diagram of the circuit of the present invention,

FIG. 2 is an enlarged cross-sectional view taken along the line 2—2 of FIG. 1, and FIG. 3 is a cross-sectional view taken along the line 3—3 of FIG. 2.

DESCRIPTION OF THE PREFERRED EMBODIMENT

While the present invention will be described in connection with a waste wood veneer chipper, for purposes of illustration only, the present invention is useful for detecting when the bolts or other fasteners, holding coacting surfaces of two members together, become loose.

Referring now to the drawings, and particularly to FIGS. 1 and 2, the reference numeral 10 generally indicates a portion of a wood chipper such as one which cuts waste veneer wood into chips for various uses such as in papermills. The chipper 10 includes a chipper anvil 12 which is secured to a base 14 by a plurality of fasteners or bolts 16 and is accurately positioned thereon by a key 18. In a chipper the anvil and base may be of a length of approximately two feet and a cutter rotates adjacent the anvil with a clearance of 0.020 or 0.030 of an inch for cutting waste veneer into chips. However, maintaining the anvil 12 in a secure relationship with the base 14 has been a problem in the past. The chipper is an expensive piece of equipment, and is subjected to a moisture environment and high impact forces which create vibration in the chipper 10. This has tended to loosened the bolts 16 causing expensive damage to the chipper, high repair costs and the loss of expensive operational time. In fact, mere excessive movement can damage the base 14.

The present invention is directed to an apparatus for detecting when the bolts 16 are loosened or are defective by measuring when the coacting surfaces 20 and 22 of the chipper anvil 12 and the chipper base 14, respectively, separate. Therefore, a gas passageway generally indicated by the reference numeral 24 having one or more branches 24a is provided in one of the members 12 or 14, such as in the base 14, and extends at its ends to the coacting surfaces 20 and 22. Preferably, as best seen in FIG. 1, a gas passageway 24 is provided adjacent each end of the base 14 as it is the ends of the anvil 12 which have the greatest tendency to become loose and separate because of vibration.

The gas passageway 24 is connected to a gas supply connection 28 which may be connected to a suitable plant gas supply such as plant air supply or other inert gas or to a compressor for supplying air. If desired, air filters 30 and 32 may be provided along with a pressure regulator 34 for providing a suitably clean and regulated pressurized gas supply. In addition, a check valve 36 may be provided for allowing passage of gas towards the passageways 24 from the gas connection 28 but preventing gas flow towards the gas connection.

A gas reservoir 38, preferably with a pressure gauge 40, is connected to and positioned downstream of the gas connection 28 for accumulating a supply of gas which can be maintained at the proper pressure and volume for being a detector. A flow orifice 42 is connected to the reservoir 38 and positioned downstream of the reservoir 38 for providing the desired pressure in the downstream passageways 24.

One of more pressure switches 44 and 46 are connected to the gas passageway 24 downstream of the orifice 42. The switches 44 and 46 are conventional, normally closed switches which are biased to the closed position by a spring and which are moved to the open position in response to a predetermined value of pressure existing in the passageways 24. Suitable alarm means 48 and 50, such as lights or horns, are connected to the switches 44 and 46, respectively, such as by electrical lines 52 and 54, respectively. The alarms 48 and 50 are actuated when the switches 44 and 46 are actuated upon a predetermined loss in pressure in the passageway 24. While the switches 44 and 46 and the alarms 48 and 50 may be redundant alarm systems, it is preferred that one of the switches 44 or 46 be actuated at one predetermined gas level loss and the other switch be actuated at a different gas level loss to provide different signals, one of which is merely a warning signal and the other is a shutdown signal. Normally, the interfaces 20 and 22 between the anvil 12 and the base 14 are not gas tight and so even when the anvil 12 is fully secured to the base 14 some gas will flow out between the interface. However, if the bolts 16 become loose, the anvil 12 and the base 14 will separate due to vibration allowing a flow or greater flow of gas from between the interfaces 20 and 22 which will reduce the gas pressure at the switches 44 and 46 causing at least one of the switches to be actuated and which in turn activate one of the alarms 48 and 50.

It is also desireable to extend the passageways 24a to the area of the bolts 16 by providing a groove 52 from the passageways 24a to the area around each of the bolts 16. This will allow gas to escape between the bottom 54 of the head of the bolt 16 and its coacting surface 56 when a bolt 16 becomes loose, or broken due to overloads, being over tightened, or the bolt is imperfectly manufactured or has cracks. Loss of gas through the grooves 52 will actuate the alarm system.

If the bolts 16 become loose, a small separation of the members 12 and 14 will quickly allow escape of the gas and quickly lower the pressure for providing a fast acting alarm. For purposes of illustration only, one satisfactory system uses a reservoir 38 having an air pressure of about 60 psi and the first pressure switch 44 is satisfactorily set to be actuated when the pressure in the passageway drops to 50 psi and the second switch 46 is set to be actuated when the pressure drops to 40 psi.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts, will readily suggest themselves to those skilled in the art, and which are encompassed within the spirit of the invention and the scope of the appended claims.

What is claimed is:

1. An apparatus for detecting when bolts, holding coacting surfaces of a chipper anvil to a chipper base, become loose, comprising,
   a gas passageway in the base extending to the said coacting surfaces,
   a gas supply connection connected to the gas passageway,
   a gas reservoir connected to and positioned downstream of the gas connection,
   a flow orifice connected to the reservoir and positioned downstream of the reservoir,
   a pressure switch connected to the gas passageway downstream of the orifice, said switch actuated upon a drop of the gas pressure to a predetermined value, and
   alarm means connected to and actuated by the switch for providing an indication of the separation of the coacting surfaces.

2. The apparatus of claim 1 including,
   a check valve positioned between the gas supply connection and the gas reservoir for allowing the flow of gas to the reservoir.

3. The apparatus of claim 1 wherein the gas passageway includes,
   a gas passageway adjacent each end of the base extending to the coacting surfaces and connected to the gas supply connection.

4. The apparatus of claim 1 including,
   a second pressure switch connected to the gas passageway downstream of the orifice and positioned downstream of the reservoir, said second switch actuated upon a drop of gas pressure to a predetermined value different from the actuation of the first switch, and
   second alarm means connected to and actuated by the second switch for providing an indication of the separation of the coacting surfaces.

5. A wood chipper comprising,
   an anvil base having a first surface,
   a chipper anvil having a second surface,
   a plurality of bolts connected between the anvil base and chipper anvil securing the first surface to the second surface forming coacting surfaces exposed to the atmosphere,
   a gas passageway in the base extending to said coacting surfaces,
   a gas supply connection connected to the gas passageway,
   a flow orifice connected to and positioned downstream of the gas connection,
   a pressure switch connected to the gas passageway downstream of the orifice, said switch actuated upon the drop of gas pressure to a predetermined value, and
   alarm means connected to and actuated by the switch for providing an indication of the separation of the coacting surfaces.

6. The apparatus of claim 5 wherein the anvil base and chipper anvil are elongate members having first and second ends of said gas passageway extends to the coacting surfaces adjacent each of the ends.

7. The apparatus of claim 5 wherein the gas passageway extends to at least one of the bolts for detecting a defect in said bolts.

* * * * *

UNITED STATES PATENT OFFICE
CERTIFICATE OF CORRECTION

Patent No. 4,806,913      Dated February 21, 1989

Inventor(s) Charles J. Schmidt

It is certified that error appears in the above-identified patent and that said Letters Patent is hereby corrected as shown below:

Column 3, line 21, after "way" insert an -- s --

Column 4, line 60, delete "of" and insert -- and --

Signed and Sealed this

Fifth Day of December, 1989

*Attest:*

JEFFREY M. SAMUELS

*Attesting Officer*     *Acting Commissioner of Patents and Trademarks*